March 8, 1966 E. L. GREENBERG ETAL 3,238,795
COMPENSATED GYROSCOPE
Filed Feb. 19, 1962 2 Sheets-Sheet 1

INVENTORS:
Edmond L. Greenberg
Harry H. Holloway
Jerome S. Lipman

By Richard L. Ehrlich
Attorney

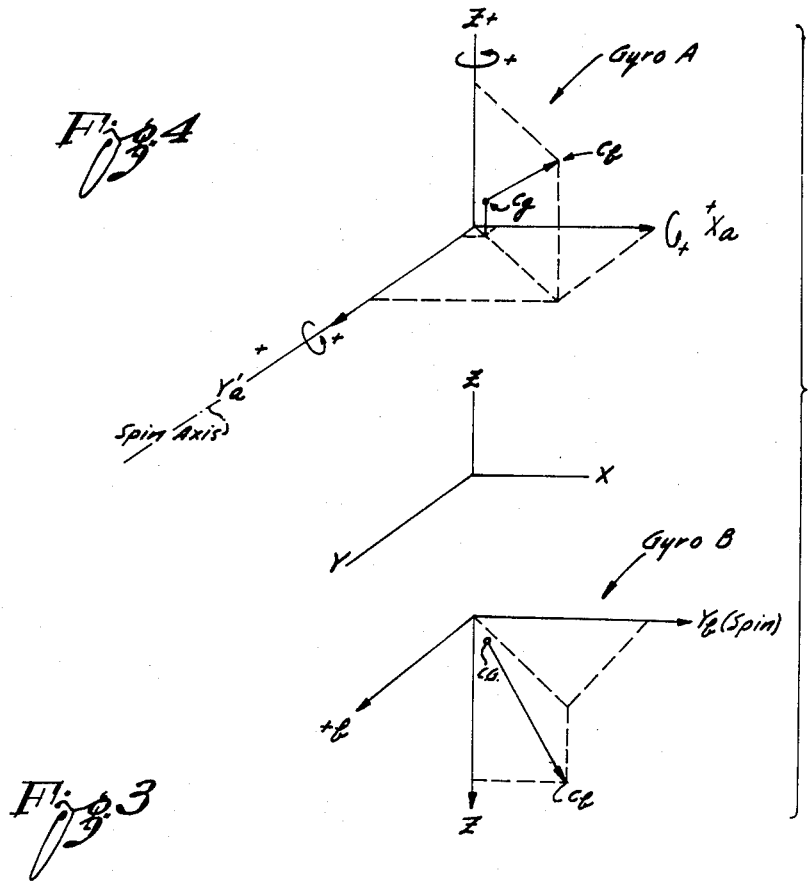
Fig. 4
Fig. 3
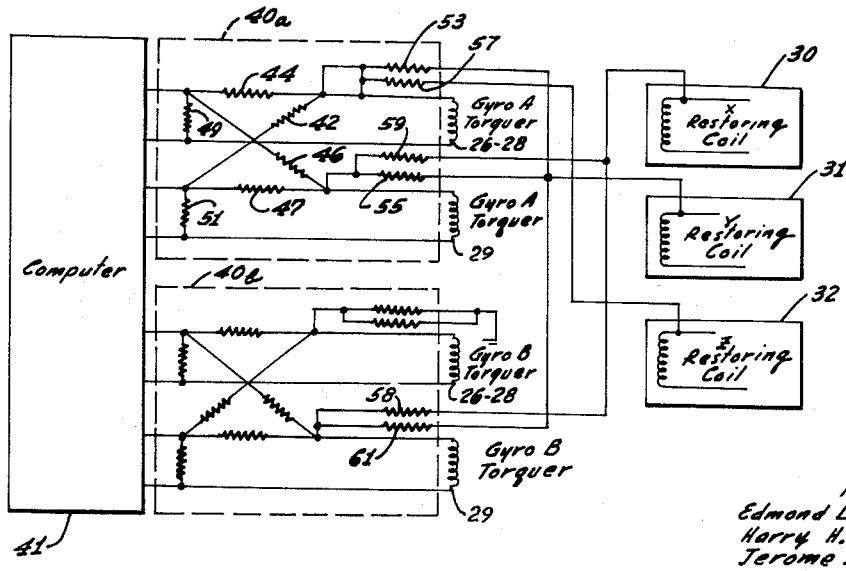
INVENTORS:
Edmond L. Greenberg
Harry H. Holloway
Jerome S. Lipman
By Richard K. Ehrlich
Attorney

United States Patent Office 3,238,795
Patented Mar. 8, 1966

3,238,795
COMPENSATED GYROSCOPE
Edmond L. Greenberg, Culver City, and Harry H. Holloway and Jerome S. Lipman, Los Angeles, Calif., assignors to Litton Systems, Inc., Beverly Hills, Calif.
Filed Feb. 19, 1962, Ser. No. 173,900
14 Claims. (Cl. 74—5.47)

The present invention relates to a compensated gyroscope and more particularly to a compensated gyroscope wherein the gyro drift rate is unaffected by mass imbalance of the gyroscope.

There exists in numerous fields a need for accurately stabilized platforms. For example, in the inertial guidance field it is necessary to mount acceleration measuring devices or accelerometers upon a stabilized platform so that the orientation of the accelerations sensed by each accelerometer is maintained constant. As is well known to one skilled in the art, a stabilized platform is generally mechanized by using two or more gyroscopes to sense rotation of the platform and to torque the platform to resist any such rotation. However, the amount of drift or unwanted platform rotation experienced by the platform is directly related to the drift rate of the gyroscope. Accordingly, there is a great need in the prior art for ultra precision gyroscopes.

Accordingly, much effort has been directed by those skilled in the art in perfecting ultra-precision gyroscopes. For example, in U.S. Patent No. 2,933,925 issued April 26, 1960, to Henry E. Singleton and Harold F. Erdley, a two-degree-of-freedom ultra-precision gyro is described. As is set forth therein since the gyro is free to rotate about two mutually orthogonal axes no precession of the gyro occurs in response to rotation of the platform upon which the gyro is mounted since torques are not transmitted to the gyros by such platform rotation.

Furthermore, since torques are not transmitted to the gyros by platform rotations, the gimbal bearings can safely be made small and light relative to prior art single-degree freedom gyros thereby greatly reducing recurring friction which would otherwise cause platform drift. In addition, to further reduce the bearing friction the gyro element is neutrally suspended in a floatation fluid so that the gimbal bearings are free from supporting the weight of the gyro element and thus can be further reduced in size and weight.

While the ultra-precision two-degree-of-freedom floated gyroscope of the Singleton and Erdley design is, relative to other prior art gyros, an extremely accurate instrument, in the most demanding of applications where only extremely small increments of platform drift are permissible the gyro is not accurate enough. Analysis of the operation of the Singleton and Erdley gyroscope reveals that in large part the drift exhibited by the Singleton and Erdley gyroscope is due to the torque exerted on the gyro as a result of gyro mass imbalance.

More particularly, as is well known in the art if the center of gravity of a gyro is not positioned along the gyro gimbal axis or in the case of a two-degree-of-freedom gyro at the point of intersection of the axes the gyro will experience a torque whenever the gyroscope is subjected to an acceleration. Furthermore, in a two-degree-of-freedom floated gyroscope the center of gravity, center of buoyancy and point of intersection of the two spin axes must be coincident. Otherwise, the gyroscope will experience an undesirable torque upon application of an acceleration to the gyroscope which torque will precess the gyro causing it to drift. Since the platform is slaved to the gyro, gyro drift will cause platform drift and thereby affect the accuracy of the stabilized platform.

It should be noted that in accordance with prior art techniques for minimizing mass imbalance a number of screw-on weights or the like are positioned on each gyroscope so that after the gyro has been operated on a tilt stand in various different orientations and the mass imbalance of the gyro has been ascertained, the appropriate screw-on masses can be removed, cut and replaced whereby the mass of the gyro can ge slightly changed to minimize the mass imbalance. While this process is successful in somewhat reducing the mass imbalance of the gyroscope the weights can be cut and reduced with only a certain degree of accuracy so that the amount of correction that can be made in the mass imbalance is limited. Accordingly, there is still a great need in the prior art for the production of a gyroscope whose drift rate is unaffected by mass imbalance.

According to the present invention, a compensated gyro is mechanized to compensate for gyroscope mass imbalance so that the gyro drift rate is not increased by the torque generated as a result of the application of accelerational forces to the unbalanced gyro. More particularly, the gyroscope is compensated by counter-torquing the gyro by applying a torquing signal representative of the magnitude of the applied acceleration to the gyro torques. Since it can be shown that the magnitude of the mass imbalance torque applied to the gyroscope is proportional to the applied acceleration, by properly scaling of the torquing signal the mass imbalance torque can be completely cancelled by the equal and oppositely directed torque whereby the gyro experiences no precession and hence no drift as a result of the mass imbalance.

As should be apparent to anyone skilled in the art gyro compensation is easily accomplished in most applications since gyros are generally used in conjunction with accelerometers. For example, accelerometers are mounted upon inertial platforms so that the gyros utilized to stabilize the platform can be compensated by simply scaling the output signals from the accelerometers and applying them directly to the gyro torquers. It should be noted in this regard that since the accelerometers as well as the gyros are located on the platform no problem is involved in making the necessary interconnections since no wiring external to the platform is required.

In one embodiment of the invention, a low drift gyro stabilized platform having accelerometers mounted thereon for sensing accelerations along three mutually orthogonal axes is mechanized in accordance with the invention to transmit a portion of each of the accelerometer output signals to an appropriate scaling network and then to the appropriate gyro torquer to torque the gyro in a manner proportional to the magnitude of the accelerations applied thereto to null the mass imbalance torque. Therefore, the gyro experiences no precession or drift as a result of the gyro mass imbalance.

It is therefore an object of the present invention to provide an extremely low drift gyro stabilized platform.

It is another object of the present invention to provide a gyro-stabilized platform incorporating therein a compensated gyro which experiences no precession as a result of gyro mass imbalance.

It is a further object of the present invention to provide a compensated gyroscope having a drift rate which is unaffected by the magnitude of the mass imbalance of the gyro.

It is a still further object of the present invention to provide a compensated gyro wherein a torquing signal representative of the magnitude of the acceleration experienced by the gyro is applied to the gyro torquers to torque the gyro to cancel out mass imbalance torques experienced when the gyro is subjected to accelerations.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIGURE 3 is a partly block-partly circuit diagram of a compensating circuit network of the present invention; and FIGURE 4 is a schematic drawing useful in describing the operation of the present invention.

Figure 1:
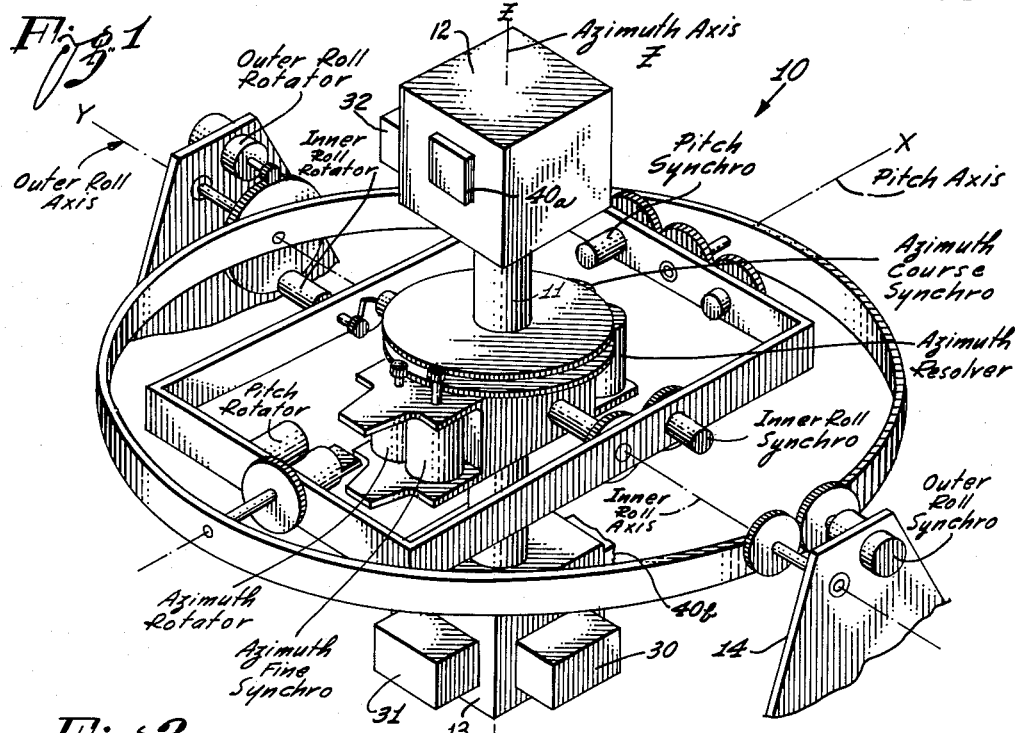
FIGURE 1 is a three-dimensional view of an inertial platform employing compensated gyros of the present invention.

Referring now to the drawings wherein like or corresponding parts are referred to by the same reference characters throughout the several views, there is shown in FIGURE 1 a gyro-stabilized platform generally designated 10 which includes a pair of compensated two-degree-of-freedom gyroscopes designated gyro A and gyro B which are affixed to and stabilize a stabilizable element 11, gyros A and B being contained within enclosing boxes 12 and 13. As will be described herein the gyros operate in coordination with one another to define the platform coordinate system which is fixed in spacial orientation. As is well known in the art the gyros sense any rotational displacement of stabilizable element 11 and generate pick-off signals representative thereof which are used to rotate element 11 with respect to a reference frame 14 to continuously stabilize the platform in inertial space.

As is apparent from FIGURE 1, in order to allow stabilizable element 11 to be freely rotated with respect to the reference frame, element 11 is mounted in a four axis gimbal suspension system. While one skilled in the art should be acquainted with the manner of operation of such a gimbal system to rotate the stabilizable element relative to the frame in response to the pick-off signals attention is directed to U.S. Patent No. 2,949,785 issued August 23, 1960, to H. E. Singleton entitled, "Low Drift Gyro-Stabilized Platform" wherein there is contained a detailed discussion of such a system and its operation.

Figure 2:
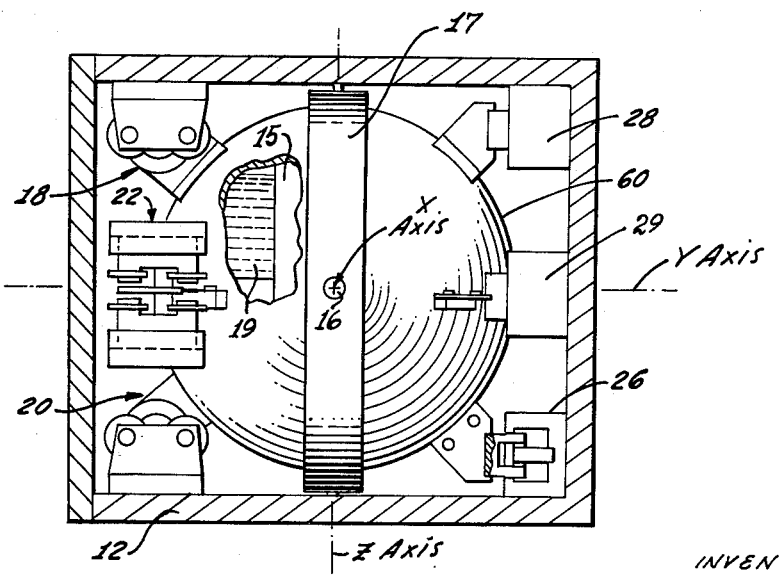
FIGURE 2 is a side view, partially broken away, of a two-degree-of-freedom prior art gyro.

Referring now to FIGURE 2, there is shown in an illustrative view of a conventional floated two-degree-of-freedom gyro suitable for use as either of the gyros A and B. As shown in FIGURE 2, the gyro includes a conventional rotor-drive unit including a rotor 15 floated by a fluid 19 in a floated spherical shell 60 which is suspended from and pivoted by bearings 16 in a gimbal 17 so that the shell is free to rotate about an axis designated as the axis of the gyro, gimbal 17 being in turn suspended from and pivoted by bearings in box 12 (which function as a gimbal ring) so that the shell is free to rotate about an axis designated as the Z axis of the gyro.

As is further shown in FIGURE 2, the gyro also includes two pairs of electromagnetic error signal pick-off assemblies which are employed for detecting rotational displacement of rotor shell 60 relative to outer housing 12. More particularly, the gyro of FIGURE 2 includes a pair of error signal pick-off assemblies generally designated 18 and 20, for detecting rotational movement of the rotor shell about the X axis, and a pair of error signal pick-off assemblies for detecting rotational movement of the rotor shell about the Z axis, only one pick-off assembly designated 22 being visible in FIGURE 2. The reason for employing two error signal pick-off assemblies is to differentiate rotational movements about the associated axis from any translational movements of the rotor shell which could conceivably occur under certain conditions of temperature and acceleration.

In addition, the gyro includes two pairs of torquer assemblies for applying to the rotor shell predetermined correction torques. More particularly, the torquer assemblies are used for entering correction torques representative of earth rate and platform velocity rate, these torques being utilized to precess the gyro rotor shell to maintain the gyro rotor in a predetermined attitude with respect to the earth regardless of the fact that the platform is moving from one latitude to another across the surface of the earth. In addition, in the compensated gyro of the invention, the torques are used to torque the gyro to nullify mass imbalance torques generated when accelerations are applied thereto because of the gyro mass imbalance. As shown in FIGURE 2, the gyro includes two torquers 26 and 28 for torquing the rotor shell about the X axis to precess the rotor shell about its Z axis and two torquers for applying torque about the Z axis to precess the rotor about the X axis, only one torquer, designated 29, of this latter pair being visible.

Referring again to FIGURE 1, stabilizable element 11 has mounted thereon a plurality of three accelerometers 30, 31, and 32 for detecting accelerations along known coordinate axes to be herein designated as the X, Y, and Z coordinate axes respectively. Although it should be understood that many different types of prior art accelerometers might be utilized in connection with a gyro stabilized platform of the type shown in FIGURE 1 an especially suitable type of accelerometer is disclosed in copending U.S. Patent Application, Serial No. 814,487, filed May 20, 1959, now Patent No. 3,078,721 and entitled "Miniaturized Temperature Insensitive Accelerometer."

Continuing with the description of the invention, the accelerometers are maintained with their sensitive axes oriented along the appropriate coordinate axes through the operation of the gyroscopes in maintaining platform 11 fixed in inertial space. Accordingly, the accuracy with which the accelerations are sensed is dependent upon the platform having an extremely small drift rate, the platform drift rate of course depending upon the drift rate of gyroscopes A and B.

As has been hereinabove discussed, the drift rate of a conventional uncompensated gyroscope will be affected by accelerations applied to the platform due to the fact that, regardless of the precision involved in the manufacturing process, every gyroscope exhibits some degree of mass imbalance. For example, it is impossible to fabricate a two-degree-of-freedom floated gyroscope with the center of buoyancy and the center of mass of the gyro rotor shell falling exactly at the point of intersection of the gimbal axes. Therefore, upon application of acceleration to the platform, torques are exerted on the rotor shell of an uncompensated gyro about one or both of the gimbal axes causing the gyroscope to precess or drift about either or both the gimbal axes. Remembering that element 11 is slaved to the gyroscopes it is clear that, if uncompensated gyros are used, the gyro drift will result in platform drift so that the ability of the platform to accurately sense acceleration is extremely limited by mass imbalance.

As is indicated in FIGURE 1 gyros A and B are compensated in accordance with the invention by means of a pair of compensating networks 40a and 40b respectively. Each compensating network has applied thereto the accelerometer output signals from accelerometer 30, 31 and 32. In accordance with the invention, compensating network 40a is responsive to the accelerometer signals for scaling the signals in an appropriate manner and for applying the resulting scaled accelerometer signals to gyro A to cancel the torques caused by the mass imbalance of gyro A which would otherwise be experienced by the gyroscope. In a like fashion, compensating circuit 40b applies the scaled accelerometer signals to gyroscope B to nullify any such mass imbalance torques. Therefore, the mass imbalance of the gyroscopes does not cause either of the two gyroscopes to drift.

Referring with more particularity to the manner of application of the accelerometer signals to the gyroscope torquers, attention is directed to FIGURE 3 wherein there is shown a partly block-partly circuit diagram of compensating circuits 40a and 40b and their interrelationship to the accelerometers 30, 31, and 32 as well as an external computer for torquing the gyroscopes to enter earth rate and vehicle movement to the platform system.

As is shown in FIGURE 3, in accordance with the present invention, the gyro torquers are further utilized to torque the gyros in accordance with the accelerations experienced by stabilizable element 11 so that torques equal but opposite in direction to those generated by the gyro mass imbalance are created which nullify the mass imbalance torques.

More particularly, as is indicated in FIGURE 3, the accelerometer signals from accelerometers 30, 31 and 32 are applied to compensating network 40a while the signals from accelerometer 30 and 31 are applied to compensating network 40b. As is shown in FIGURE 3, the torquer coils of gyro A are connected to compensating circuit 40a so that the appropriate properly scaled accelerometer signals are applied to the gyro A torquing coils to generate torques that exactly compensate for the mass imbalance of gyro A. In a like manner, the torquing coils of the torquers of gyro B have the properly scaled accelerometer signals from accelerometers 30 and 31 applied thereto so that the torque resulting therefrom cancels the mass imbalance torques of gyro B.

As is shown in FIGURE 3, an external computer 41 is also coupled to compensating networks 40a and 40b for supplying to the gyro torquers through the compensating network signals to maintain the platform horizontally oriented relative to the earth.

Before discussing with particularity the compensating networks it should first be pointed out that in two-degree-of-freedom gyros difficulty has been encountered in positioning the torquer axes in exactly an orthogonal relationship. Accordingly, if precise gyro operation is required it is necessary to make adjustments in the torquing signals applied to the gyro torquing coils to make allowance for the degree of misalignment which is unique to each individual gyro. Furthermore, for any particular type of gyro it has generally been found to be preferable to adjust the gyro torquers so that a uniform torquing constant exists between the two pairs of inner and outer gimbal torques. In the case of the gyroscope disclosed in FIGURE 2, a torquing constant of approximately 30 degrees/hours/ma. of torquing signal has been found to be quite preferable.

Referring now with particularity to compensating circuit 40a, a plurality of resistors 42, 44, 46 and 47 are utilized to compensate for gimbal axes misalignment while a pair of resistors 49 and 51 are provided to permit adjustment in the torquer torquing constant so that the inner and outer gimbal torquing constant can be adjusted to the same predetermined value. As is shown in FIGURE 3, a pair of resistors 53 and 55, on the contrary, are used to scale the accelerometer signal from accelerometer 31 so that the torques generated by the gyro A torquers are equal in magnitude but opposite in polarity to the mass imbalance torques experienced by gyro A as a result of the application of accelerations oriented along the Y or spin axis of gyro A. In a like manner, a resistor 57 scales the accelerometer signal from accelerometer 32 so that torquers 26 and 28 of gyro A generate a torque equal in magnitude but opposite in polarity to the mass imbalance torques experienced by gyro A as a result of accelerations applied thereto oriented along the gyro Z axis.

As is further shown in FIGURE 3, compensating network 40b is similar to compensating network 40a except that compensating network 40b is connected to the torquing coils of gyro B instead of gyro A. As will be further noted in FIGURE 3, torquers 26 and 28 of gyro B are not connected to any of the three accelerometers 30, 31 or 32. In this regard, it should be noted that it is not necessary to torque gyro B about the X axis thereby causing precession about the Z axis since it is not necessary to utilize or monitor the Z axis position of gyro B. This is true because the Z axis of gyro A is commonly oriented with the Z axis of gyro B so that the information needed for stabilization can be obtained from gyro A. However, if desirable, torquers 26 and 28 could be connected to the appropriate accelerometers and the platform could then be slaved to the average position of the Z axes of gyros A and B. As is further indicated in FIGURE 3, the remaining pair of gyro B torquers 29 are connected to accelerometer 30, through a scaling resistor 58, and to accelerometer 31 through a scaling resistor 61, resistors 58 and 61 scaling the appropriate accelerometer signals to cause the torquer pair to exert torques on the rotor shell opposite in polarity to the mass imbalance torques generated by the application of accelerations oriented along the X and Y gyro axes.

Continuing with the discussion of the invention, numerous methods of determining the magnitude of resistors 42, 44, 46, 47, 49, and 51 for any particular gyro to provide the required compensation for gimbal axis misalignment and for properly determining the torquer scale factors will be apparent to one skilled in the art. However, if the gyro is mechanized in such a manner that the mass of the gyro can be modified in some degree such as with screws that can be trimmed or shaved, a rough measure of the gyro mass imbalance should be first ascertained by monitoring the gyro pick-off signals when the gyro is operated in a number of different preselected orientations and then minimizing the mass imbalance by properly trimming the trim screws to make a rough correction to reduce the mass imbalance and insure that the center of mass and buoyancy are generally located in the manner hereinafter described.

The torquer axis misalignment should then be determined by any one of numerous methods known to those skilled in the art. In regard to determining the torquer scale factor of the torquers, it should be noted that while such a determination could be made separately to determine the value of resistors 42, 44, 46 and 47 by numerous prior art methods, it is preferable to combine this operation with the determination of the magnitude of the accelerometer signal scaling resistors, such as resistors 53 and 57, as will be hereinafter discussed.

Considering now the manner of operation of the present invention, attention is directed to FIGURE 4, wherein there is shown three sets of coordinate systems $X_a$–$Y_a$–Z, $X_b$–$Y_b$–Z, and X–Y–Z. As is indicated in FIGURE 4, the coordinate system $X_a$–$Y_a$–Z refers to the gyro coordinates of the top gyro of element 11 or gyroscope A while coordinate system $X_b$, $Y_b$, Z refers to the coordinate system of the lower gyro or gyroscope B, gyroscopes A and B having a common Z axis. As is further indicated in FIGURE 4, the X, Y, Z coordinate system refers to the platform or accelerometer coordinate system rather than any gyro coordinate system. As is indicated in FIGURE 4, gyroscope A is positioned on stabilizable element 11 in such a manner that the gyro coordinates correspond to the platform coordinates. However, since the bottom gyro is flipped over with respect to the top gyro the X and Y coordinates of gyro B are opposite to those of the platform coordinates.

Continuing with the discussion of the invention, while it is not necessary that the center of gravity and center of buoyancy be located in a predetermined quadrant nor that the center of buoyancy be further from the intersection of the gyro gimbal axes than the center of gravity, this situation is preferred since it simplifies the mechanization of the compensating network. For example, compensating networks 40a and 40b shown in FIGURE 3 have been designed to compensate for gyro mass imbalance torques on the basis that the center of buoyancy and center of gravity of the compensated gyro are indicated in FIGURE 4, the center of mass and buoyancy then being positioned in the quadrant defined by position X, Y, and Z coordinates with the center of buoyancy further from the gyro gimbal axes intersection than the center of mass. This relationship between the center of buoyancy and center of gravity can be determined by unbalancing the gyro in a predetermined direction in an amount that exceeds the known normal manufacturing tolerances so that regardless of the mass imbalance variations, within the manufacturing tolerances the center of gravity and center of buoyancy will have the proper relationship. Therefore, if the general relations of the center of buoyancy and the center of gravity can be predetermined with certainty the polarity of the electrical accelerometer signal correction can be predicted and the compensating circuit can be simplified.

Examining now the effect of accelerations on gyroscope A, with the center of buoyancy and center of gravity configuration shown in FIGURE 4 it can be seen that if the Z axis oriented acceleration is applied to the gyroscope the lever arm of the center of buoyancy will be greater than the center of gravity so that a net torque tending to rotate the gyro in a negative direction about the $X_a$ axis will be experienced by the gyro. On the other hand, if an acceleration oriented along the $Y_a$ or gyro spin axis is experienced, a torque will be generated tending to rotate the gyroscope in a negative direction about the Z axis and in a positive direction about the $X_a$ axis.

Directing attention again to FIGURE 3, it should be noted that compensating circuits 40a and 40b are designed in such a manner that the gyro torquers are excited to exert torques on the gyroscope which are opposite in polarity but equal in magnitude to the mass imbalance torques just discussed. For example, as can be seen from FIGURE 3 the accelerometer signal from accelerometer 32 which is representative of acceleration applied along the Z axis of gyro A is applied through scaling resistor 57 to torquers 26 and 28 which torque the rotor shell about the X axis. However, circuit 40a is mechanized in such a manner that the torque exerted by torquer coils 26 and 28 is oppositely directed to the torque exerted on the gyro as a result of the application of acceleration along the Z axis. As has been previously mentioned, resistor 57 has been determined in such a manner that the magnitude of the accelerometer signal from accelerometer 32 is scaled to produce a torque equal to the mass imbalance torque. Similar analysis of the operation of compensating circuits 40a and 40b will clearly demonstrate that the gyro torquer coils will be actuated to generate torques of sufficient magnitude and proper polarity to nullify each and every torque produced by gyro mass imbalance.

Continuing with the discussion of the invention, the magnitude of the scaling resistors such as resistors 53 and 57 can be easily ascertained by placing each gyroscope to be compensated on a gyro tilt stand or like structure and operating the gyro in a number of different orientations whereby the gravitational force of the earth is used to exert a known accelerational force along the three coordinate axes of the gyro. By monitoring the gyro pick-off signals during the foregoing described gyro operation the drift rate of the gyro about the gimbal axes can be ascertained and the resistor values can be calculated from the magnitude of the gyro drift which is representative of the gyro mass imbalance.

While it is not necessary to locate the compensating network on the gyro compensated by the network, it is quite convenient to do so since the resistive values of any compensating network are determined in relation to a particular gyroscope and will compensate mass imbalance of that particular gyroscope in any gyroscope application. Accordingly, if the compensating network is affixed to the side of the gyroscope it is always associated with and ready for use with the gyroscope for which it has been designed. It should also be noted that rather than fabricating the compensating network as a separate assembly and affixing it to the gyroscope, the compensating network can be fabricated as an integral part of the gyroscope housing or structure.

It is to be expressly understood, of course, that the particular form of the gyroscope, its pick-off and/or torquer assemblies are not to limit the invention, nor is the form of the particular rotor assembly. In addition, is should be expressly noted that while the concepts of the present invention have particular applicability to two-degree-of-freedom floated gyroscopes they can also be utilized to advantage in single-degree-of-freedom gyros and in non-floated gyros of all types. Accordingly, the invention is limited only by the spirit and scope of the appended claims.

What is claimed as new is:

1. A gyroscope compensated for mass imbalance so that the gyroscope drift rate is not increased by mass imbalance of the gyroscope, the combination comprising:
   a gyro including a gyro housing and a gyro rotor rotatable about a spin axis, said gyro further including gimbal apparatus for defining a gimbal axis orthogonal to said spin axis, said gyro also including a gyro torquer actuatable for torquing said rotor element about said gimbal axis;
   generating means sensitive to applied accelerations for generating first and second signals representative of accelerations applied to the gyroscope along said spin axis and an axis orthogonal to said spin and gimbal axes;
   and compensating means interconnecting said generating means and said gyro torquer for applying said first and second signals to said gyro torquer.

2. The combination defined in claim 1 wherein said compensating means includes first and second scaling resistors interconnecting said generating means with said gyro torquer, said first and second signals being applied to said gyro torquer through said first and second scaling resistors, respectively.

3. In a compensated gyroscope experiencing torques as a result of mass imbalance, the combination comprising:
   a gyro housing;
   a gyro rotor element positioned within said housing and having a spin axis and a center of mass;
   means for rotatably connecting said rotor element to said gyro housing, said means defining first and second mutually orthogonal gimbal axes, said gimbal axes being orthogonal to said spin axis;
   a floatation fluid filling said housing member and surrounding said rotor element, said rotor element being held in substantially neutral suspension by said fluid;
   first and second pairs of gyro torquers positioned adjacent said rotor element and being actuatable to rotate said rotor element about said first and second gimbal axes, respectively;
   and compensating means generating first and second torquing signals for actuating said torquers to exert on said rotor element, torques substantially equal and opposite to the mass imbalance torques exerted on said rotor element whereby said mass imbalance torques are nullified and do not affect the gyro drift rate.

4. In a compensated gyro stabilized platform using compensated gyros for stabilization, said combination comprising:
   first and second gyros, each including a gyro housing and a gyro rotor element having a spin axis and being connected to said gyro housing by a pair of means defining first and second gimbal axes orthogonal to each other and said spin axis, each of said first and second gyros further including first torquer apparatus for torquing said rotor element about said first gimbal axis and second torquer apparatus for torquing said rotor element about said second gimbal axis;
   a platform rotatable about an X axis, Y axis, and Z axis, where the X, Y and Z axes are mutually orthogonal;

first coupling means for coupling said first gyro to said platform with its first and second gimbal axes corresponding to the X and Z axes of said platform and with its spin axis corresponding to the Y axis of said platform;

second coupling means for coupling said second gyro to said platform with its first and second gimbal axes corresponding to the Y and Z axes of said platform and with its spin axis corresponding with the X axis of said platform;

generating means coupled to said platform and sensitive to the application of accelerations to said platform for generating first, second, and third signals representative of applied accelerations oriented along the X, Y, and Z platform axes, respectively;

and compensating means intercoupling said generating means and said first and second torquer apparatus of said first and second gyros for applying said first, second, and third signals to said torquer apparatus of said gyros for selectively actuating each of said torquer apparatus to countertorque said rotor element to neutralize torques exerted on said rotor element as a result of mass imbalance of said rotor element.

5. The combination defined in claim 4 wherein said compensating means further includes a first accelerometer generating said first signal, a second accelerometer generating said second signal, and a third accelerometer generating said third signal, respectively, and a first scaling resistor interconnecting said first accelerometer with said first torquer apparatus of said first gyro and a second scaling resistor interconnecting said first accelerometer with said first torquer apparatus of said second gyro.

6. The combination defined in claim 5 wherein said compensating means further includes a third scaling resistor for interconnecting said second accelerometer to said first torquer apparatus of said first gyro, a fourth scaling resistor interconnecting said second accelerometer to said second torquer apparatus of said first gyro, and a fifth scaling resistor interconnecting said second accelerometer to said first torquer apparatus of said second gyro.

7. The combination defined in claim 6 wherein said compensating means further includes a sixth scaling resistor connecting said third accelerometer to said second torquer apparatus of said first gyro for applying said third signal to said second torquer apparatus of said first gyro.

8. In a compensated gyroscope experiencing torques resulting from mass imbalance, the combination comprising:

a gyro housing;

a gyro rotor element positioned within said housing and having a spin axis and a center of mass;

a pair of gimbal-axis-defining means rotatably connecting said rotor element to said gyro housing, said gimbal-axis-defining means defining first and second mutually orthogonal gimbal axes, said gimbal axes being orthogonal to said spin axis;

first and second pairs of gyro torquers positioned adjacent said rotor element and being actuatable for rotating said rotor element about said first and second gimbal axes, respectively;

and compensating means generating first and second torquing signals for actuating said first and second pairs of torquers, respectively, to exert on said rotor element torques substantially equal and opposite to the mass imbalance torques exerted on said rotor element whereby said mass imbalance torques are nullified and do not affect the gyro drift rate.

9. In a gyroscope compensated for mass imbalance by the application to the gyro torquer of a torquing signal representative of accelerations applied along a predetermined axis to the gyroscope, the combination comprising:

a gyro housing;

a gyro rotor element having a center of gravity and being rotatable about a spin axis;

a gimbal ring pivotably connecting said gyro rotor to said housing defining a gimbal axis substantially orthogonal to said spin axis;

scaling means connected to the gyro torquer for scaling the torquing signal to actuate said torquer to exert a torque on said rotor substantially equal and opposite in polarity to said mass imbalance torque;

and coupling means for applying the torquing signal to said scaling means.

10. In a compensated gyroscope system compensating the gyroscope in such a manner that the gyroscope drift rate is not increased by the mass imbalance of the gyro, the combination comprising:

a gyro including a gyro supporting device and a gyro rotor element having a spin axis and being connected to said gyro supporting device by a pair of gimbals defining first and second gimbal axes orthogonal to each other and said spin axis, said gyro further including first torquer apparatus for torquing said rotor element about said first gimbal axis and second torquer apparatus for torquing said rotor element about said second gimbal axis;

generating means responsive to the application of accelerations to said gyro for generating first, second, and third signals representative of accelerations applied to said gyroscope oriented along said first gimbal axis, said second gimbal axis, and said spin axis, respectively;

and compensating means intercoupling said generating means and said first and second torquer apparatus for applying said first, second, and third signals to said first and second torquer apparatus to exert torques on said rotor element equal and opposite to the torques exerted thereon as a result of the mass imbalance of the gyro.

11. The combination defined in claim 10 wherein said compensating means includes first and second scaling resistors connecting said generating means to said first and second torquer apparatus, respectively, for applying said third signal to each of said first and second torquer apparatus, the magnitude of said scaling resistors being determined to exert on said rotor element torques about said gimbal axes substantially equal and opposite to mass imbalance torques exerted on said rotor element resulting from the application of spin axis oriented accelerations to said gyroscope.

12. The combination defined in claim 11 wherein said compensating means further includes third and fourth scaling resistors interconnecting said generating means to said first and second torquer apparatus, respectively, said first signal being applied through said third scaling resistor to said first gyro torquer and said second signal being applied through said fourth scaling resistor to said second gimbal torquer.

13. In a compensated gyro stabilized platform using compensated gyros for stabilization, said combination comprising:

a gyro including a gyro housing and a gyro rotor element having a spin axis and being connected to said gyro housing by a pair of gimbal bearings defining first and second gimbal axes orthogonal to each other, said gyro further including first torquer apparatus for torquing said rotor element about said gimbal axes and second torquer axis for torquing said rotor element about said second gimbal axis;

a stabilizable platform;

acceleration sensing means having a sensitive axis and operable for generating an electrical signal related to accelerations applied thereto along the sensitive axis;

impedance means interconnecting said acceleration sensing means and said first torquer apparatus;

and coupling means for mounting said gyro, said acceleration sensing means and said impedance means to said platform.

14. A compensated gyro stabilized platform using compensated gyros for stabilization, said combination comprising:
   a gyro including a gyro housing and a gyro rotor element having a spin axis and being connected to said gyro housing by at least one gimbal ring defining a gimbal axis orthogonal to said spin axis, said gyro including a torquer for torquing said rotor element about said gimbal axis;
   a stabilizable platform;
   accelerometer sensing means having a sensitive axis and generating a signal representative of accelerations applied thereto along the sensitive axis;
   an impedance device interconnecting said accelerometer sensing means and said torquer for applying said signal to said torquer;
   and coupling means for mounting said gyro, said accelerometer sensing means, and said impedance device on said platform.

References Cited by the Examiner

UNITED STATES PATENTS 2,949,785  8/1960  Singleton et al. _____ 74—5.34

FOREIGN PATENTS 657,670  9/1951  Great Britain.

BROUGHTON G. DURHAM, *Primary Examiner.*